United States Patent
Geagan, III et al.

(10) Patent No.: US 9,817,899 B2
(45) Date of Patent: Nov. 14, 2017

(54) SEARCHING FOR SECRET DATA THROUGH AN UNTRUSTED SEARCHER

(71) Applicant: GLOBALFOUNDRIES Inc., Grand Cayman (KY)

(72) Inventors: John Bernard Geagan, III, San Jose, CA (US); Dulce B. Ponceleon, Palo Alto, CA (US)

(73) Assignee: GLOBALFOUNDRIES, Grand Cayman (KY)

( * ) Notice: Subject to any disclaimer, the term of this patent is extended or adjusted under 35 U.S.C. 154(b) by 293 days.

(21) Appl. No.: 14/010,104

(22) Filed: Aug. 26, 2013

(65) Prior Publication Data

US 2015/0058995 A1    Feb. 26, 2015

(51) Int. Cl.
*G06F 21/00* (2013.01)
*G06F 17/30* (2006.01)
*G06F 21/62* (2013.01)

(52) U.S. Cl.
CPC .... *G06F 17/30864* (2013.01); *G06F 21/6254* (2013.01)

(58) Field of Classification Search
CPC ...... G06F 21/60; G06F 21/10; G06F 21/6245; G06F 21/6218; G06F 17/30864; G06F 21/6254
See application file for complete search history.

(56) References Cited

U.S. PATENT DOCUMENTS

| | | | |
|---|---|---|---|
| 6,275,301 B1* | 8/2001 | Bobrow | G06K 15/02 358/1.1 |
| 9,465,793 B2* | 10/2016 | Hoover | G06F 17/274 |
| 2006/0136400 A1* | 6/2006 | Marr | 707/3 |
| 2008/0154875 A1* | 6/2008 | Morscher et al. | 707/5 |
| 2009/0210412 A1 | 8/2009 | Oliver et al. | |
| 2009/0288141 A1 | 11/2009 | Khachaturov | |
| 2010/0145970 A1* | 6/2010 | Gorti et al. | 707/759 |
| 2011/0264670 A1* | 10/2011 | Banerjee et al. | 707/749 |
| 2012/0072406 A1* | 3/2012 | Iwakura et al. | 707/706 |
| 2012/0265779 A1* | 10/2012 | Hsu et al. | 707/767 |

FOREIGN PATENT DOCUMENTS

WO    2010011182    1/2010

* cited by examiner

*Primary Examiner* — Kendall Dolly
(74) *Attorney, Agent, or Firm* — George S. Blasiak, Esq.; Heslin Rothenberg Farley & Mesiti, P.C.

(57) ABSTRACT

Embodiments of the present invention relate to searching for secret data through an untrusted searcher without exposing the secret data. In one embodiment, a method of and computer program product for searching for secret data through an untrusted searcher is provided. A secret value is read from a storage medium. The secret value is divided into a plurality of portions. Each of the plurality of portions is ranked. A subset of the secret value is determined from the ranking of the plurality of portions. A search string is constructed from the subset. The search string is transmitted to a searcher via a network. Search results are received from the searcher via the network. The search results are compared to the secret value to determine whether the searcher found the secret value.

21 Claims, 3 Drawing Sheets

SEARCHING FOR SECRET DATA THROUGH AN UNTRUSTED SEARCHER

BACKGROUND

Embodiments of the present invention relate to detecting leaked secret data, and more specifically, to searching for secret data through an untrusted searcher without exposing the secret data.

BRIEF SUMMARY

According to one embodiment of the present invention, a method of and computer program product for searching for secret data through an untrusted searcher is provided. A secret value is read from a storage medium. A plurality of portions is extracted from the secret value. Each of the plurality of portions is ranked. A subset of the secret value is determined from the ranking of the plurality of portions. A search string is constructed from the subset. The search string is transmitted to a searcher via a network. Search results are received from the searcher via the network. The search results are analyzed to determine whether the searcher found the secret value.

DETAILED DESCRIPTION

Searching for and discovering leaked secret information poses a security risk. In order to enable a searcher to search for leaked information, at least some portion of that leaked information must be disclosed to the searcher. Where the searcher is not the owner of the secret, this exposes the secret information to additional parties and thus creates additional security risks. This problem is particularly pronounced where it is unknown whether the secret information has been leaked or not. In such cases, the secret owner seeking to determine whether there has been a leak risks becoming the leak himself by searching for the secret information.

In the case of Internet searches or searches of large existing data stores, the only feasible search mechanism may be to use a third party. In the case of the Internet, it is not practical to perform a direct inspection of all accessible data. Existing search engines such as Google, Yahoo, Baidu or Bing may be the most effective and efficient means to perform a search. In addition, certain data repositories may be searchable only through a proprietary search mechanism. For example, a bulletin board system may be searchable only through a search tool provided by that bulletin board system. In such cases, submitting a search for secret information not only exposes the secret information to the search engine, but to any eavesdroppers, caches, or proxies. This exposure may be exacerbated by features such as autocorrect and autocomplete, which offer to subsequent visitors to a search engine suggested searches based on prior searches. Secret information that was previously the subject of a search may thereby be offered to another visitor. This highlights the fact that once a search engine has received a search term, it may republish that search term alone or in compilation (e.g., in a top searches list).

Despite the security risks, use of automated third party search may be desirable to provide ongoing detection of leaks. In addition, the use of a third party searcher may allow the secret owner to maintain his anonymity and conceal the fact that he is performing a search at all. Achieving this separation may require the use of a third party searcher.

According to an embodiment of the present invention, knowledge of a complete secret is limited to trusted parties. A trusted party reveals only a part of the secret data to a searcher responsible for finding instances of the secret information. The searcher may be a search engine that has access to document repositories, databases, file systems, web pages, social media outlets, forensic lab equipment, machine-readable memory, network monitor, bus monitor, or other digital resources. Searching may be conducted on a static resource, or may be conducted of ongoing traffic, such as through a network sniffer. The searcher provides to the trusted party additional context surrounding any search hits so that the trusted party may ascertain whether a search hit in fact corresponds with an instance of the entire secret.

In an exemplary embodiment, the secret is a passphrase that grants access to a protected resource. The provider of the passphrase may wish to ensure by regular Internet searches that the passphrase has not been published. However, searching for the entire passphrase may reveal the passphrase to the searcher and any intermediaries.

A passphrase may, for example, be a sequence of standard English words. Although each individual word is known, the particular sequence is unique and is used to control access to a protected system. An Internet search for an individual word may result in false hits. However, a search for certain subsets of the words in the passphrase have a low probability of resulting in false hits. Various subsets may be chosen for the search. The subset may be a subsequence of consecutive words drawn from the passphrase. The subset may comprise words in random order that appeared consecutively in the passphrase. The subset may also represent a random selection of words from the passphrase.

Each potential subset has different characteristics with regard to security and hit rate. For example, searching for an ordered subsequence of the passphrase may have a low probability of false hits, but reveals a substantial amount of information about the passphrase. If multiple different searches are conducted, an observer may be able to reconstruct the entire passphrase by stitching together the various search strings. In contrast, searching for a single word in the passphrase is likely to result in a large number of false hits, but reveals very little about the passphrase. A random subset of the passphrase, in random order, likewise reveals little about the passphrase. However, the size of the subset and the particular words included may have a substantial impact on the number of false hits. For example, the two words "green" and "apple" may appear in a highly unique passphrase, but also appear together in a large number of unrelated contexts.

In another exemplary embodiment, the secret is a document. The document may be either confidential or embargoed. The owner of the document may wish to regularly check that the document has not been revealed. Searching for the entire document not only has the drawbacks discussed above, but may be impractical due to variations between various document formats. For example, punctuation, pagination, or newline characters may vary between formats without changing the essential content. By searching for a subset of the document, the nature and content of the document may remain concealed.

In another exemplary embodiment, the secret is a numeric value. A numeric value may be expressed according to various encodings, including base 2 (binary), base 10 (decimal), base 16 (hexadecimal) or base 64. In such embodiments, the searcher is provided with a subsequence of the digits of the secret according to one or more encoding.

In some embodiments, the secret owner specifies to the searcher the type of context to be collected regarding each candidate hit. The specification may include an amount of content to be included around the potential hit. The specification may also include a request for metadata, such as date of publication, URL of publication, overall content size, content language, or other characteristics of the content in which the candidate hit occurs.

In some embodiments, the secret owner provides additional information regarding the secret sought. This information may include the semantic data type of the search string, e.g., a name, a string, a binary blob, a number, a date, or a location. The searcher may use this information to aid in searching for the secret. In some embodiments, the searcher may use the semantic information to determine what variations of the search string may be matches. For example, a search string "05272013" that is known to be a date may match May 27, 2013 as well as various other potential formats of the same information.

Figure 1:
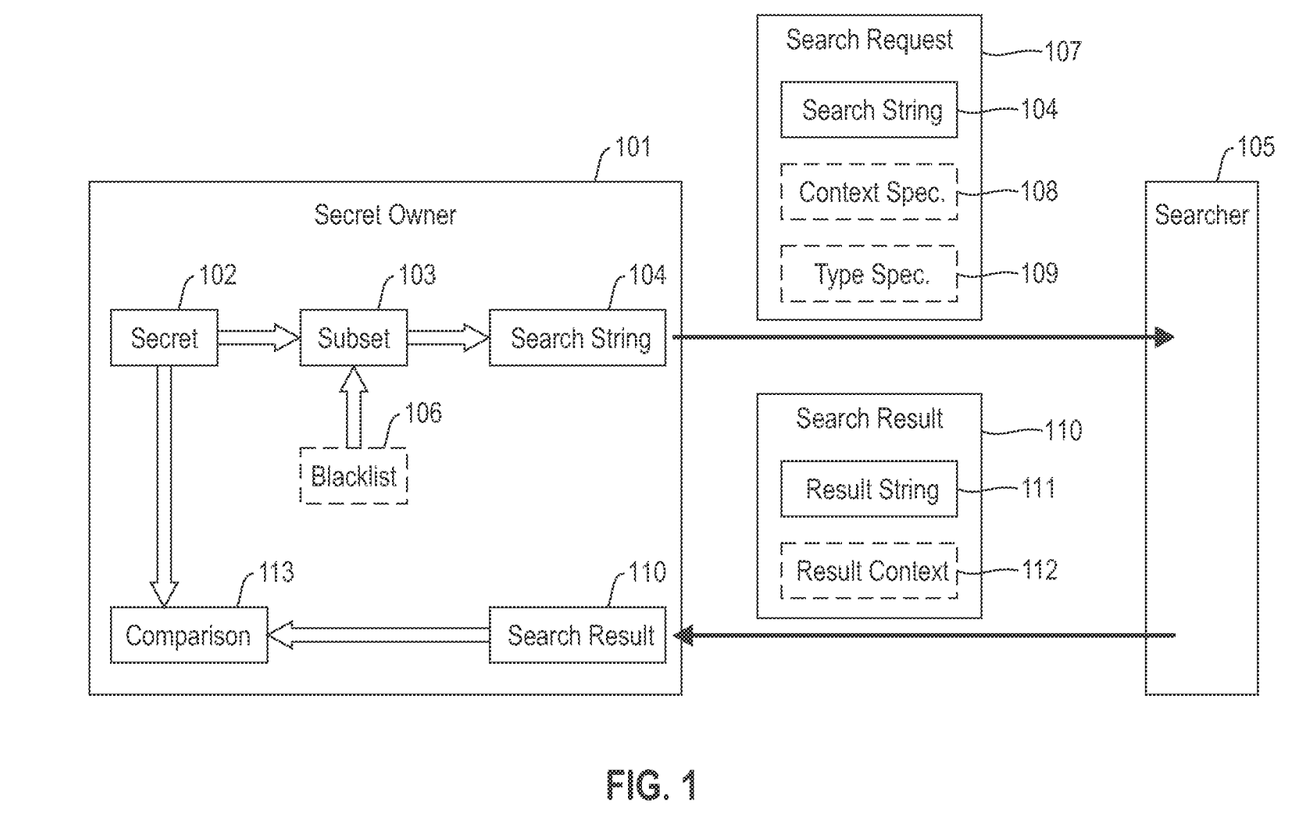
FIG. 1 depicts an exemplary data flow between a secret owner and a searcher according to an embodiment of the present disclosure.

Turning now to FIG. 1, an exemplary data flow is provided. Secret owner 101 is in possession of a secret 102. A subset 103 of secret 102 is generated. The subset 103 is transformed into a search string 104 appropriate for searcher 105. In some embodiments, the search string may comprise operators that are specific to the searcher, such as Boolean operators or proximity operators. In some embodiments, secret owner 101 includes a blacklist 106 that contains entities to be excluded from the search string. In some embodiments, search string 104 includes exclusion operators based on the contents of blacklist 106. In other embodiments, blacklist 106 is compared to subset 103, and a new subset is generated if there are too many blacklisted terms.

Secret owner 101 sends search request 107 to searcher 105. In some embodiments, an intermediary (not pictured) may relay search request 107 from secret owner 101 to searcher 105. Search request 107 comprises search string 104. In some embodiments, search request 107 further comprises a context specification 108 and/or a type specification 109. Upon receipt of search request 107, searcher 105 performs a search, and provides search result 110 back to the requester. Search results 110 include results string 111. In some embodiments, search results 110 also include result context 112, as specified by context specification 108.

Secret owner 101 takes secret 102 and search results 110, and performs a comparison 113. The results of the comparison indicate whether a match has been found. Once a match has been found, the secret owner may take further action, such as to change a passphrase that has been leaked. In some embodiments, secret owner 101 and searcher 105 communicate via a network. In other embodiments, secret owner 101 and searcher 105 are resident in the same computing environment, and communicate through an API, socket, pipe, shared memory, RPC, or other method known in the art.

In some embodiments, deliberate errors are introduced in the search string in order to disguise the secret further. For example, a misspelling may be introduced. If there exists an instance of the search string with the correct spelling, the search engine may provide that proper spelling as a potential hit, despite the variation (e.g., by applying autocorrect). In another example, noise may be introduced into the searches in the form of either additional random searches or additional terms in the search strings. In the case of additional terms in a given search string, the search engine may provide results omitting the superfluous search term if there is a potential hit containing the other terms. In general, where a fuzzy search is used to search for the secret, the search string may be crafted to be within the tolerance of the search engine without necessarily being the precise string sought.

In some embodiments, ranking heuristics are applied to select the search string that is least likely to lead to false hits for the secret. In general, these are the values that are least likely to occur randomly, and are least known. For example, in an embodiment using passphrases, the words "the", "be", "to", "of" and "and" appear so frequently in English as to be likely sources of false hits. Therefore, less common words or word combinations are preferred for inclusion in the search string. In an embodiment using numerical values, the values 0x00, 0xff, and 0xdeadbeef are likely sources of false hits, as are hexadecimal encodings of printable characters. Likewise, numerical values forming simple sequences are also likely sources of false hits (e.g., 0x1234 or 101010).

In some embodiments, the ranking heuristics vary over time. However, ranking heuristics should not be changed in such a way as to gradually reveal the entire secret. In some embodiments, the ranking heuristics applied vary based on the data type of the secret. For example, the string "eeee" may be common in hexadecimal, but uncommon in standard English.

In some embodiments, there are several heuristics applied to candidate search strings, and a best result is chosen from among them. The choice among heuristics may be based on voting among the results. In some embodiments, the various heuristics are weighted and applied according to their respective weights. In other embodiments, the various heuristics have relative priorities and are applied in the order of priority.

In some embodiments, a blacklist is applied to any candidate search string. Once a heuristic is applied to select candidate search strings, they are screened against a list of frequently occurring subsets. For example, seemingly random strings that appear frequently despite their apparent randomness may be added to the blacklist.

In some embodiments, a secret is screened against one or more of the above discussed heuristics to determine whether it is suitable for searching. If the passphrase proves to be unsuitable for search because it is likely to generate many false positives, a new passphrase may be generated in its place. In some embodiments, the passphrase is presented to a user, and they may accept or reject that passphrase. If the user rejects the passphrase, a new passphrase is generated as discussed above. In other embodiments, a user provides the candidate passphrase, which is then screened as discussed above.

In one exemplary embodiment, a ranking function for hexadecimal values is provided. Repeated hex digits are counted in each subset, and the sum of the squares of the counts is computed for each subset. If two subsets have the same value, then the tie is broken by the squares of count-of-relative-distances. If still tied (not shown), then a pseudorandom function may be applied to each subset to determine relative value. If still tied (not shown), the first occurring subset in the secret is chosen. Exemplary pseudocode is provided below at Inset 1.

Inset 1

```
void compute_snippet_values(snippet_values &sv, u8 *snippet,
long snippet_length)
{
    memset(&sv, 0, sizeof(sv));
    long hexdigit_counts[16];
    memset(&hexdigit_counts, 0, sizeof(hexdigit_counts));
    long distance_counts[16];
    memset(&distance_counts, 0, sizeof(distance_counts));
    i8 previous_hexchar = -1;
    while (snippet_length-- > 0)
    {
        u8 c = *(snippet++);
        u8 lo = (0x0f & c), hi = (0x0f & (c >> 4));
        hexdigit_counts[hi]++;
        hexdigit_counts[lo]++;
        if (previous_hexchar >= 0)
            distance_counts[(0x0f &
            (hi + 16 - previous_hexchar))]++;
        distance_counts[(0x0f & (lo + 16 - hi))]++;
        previous_hexchar = lo;
    }
    for (int i = -1; ++i < 16;)
    {
        double value = hexdigit_counts[i];
        sv.values_[0] -= (value * value);
        value = distance_counts[i];
        sv.values_[1] -= (value * value);
    }
}
```

In another exemplary embodiment, a ranking function for passphrases is provided. The sum of the squares of word counts are calculated based on a dictionary of word frequencies. The lowest scoring subset of the passphrase is selected as the least likely to result in false hits.

In some embodiments, where the secret is random, a fixed subset may be selected without the application of a ranking function. For example, a fixed length substring may be selected at a fixed offset from the start of the secret string.

Figure 2:
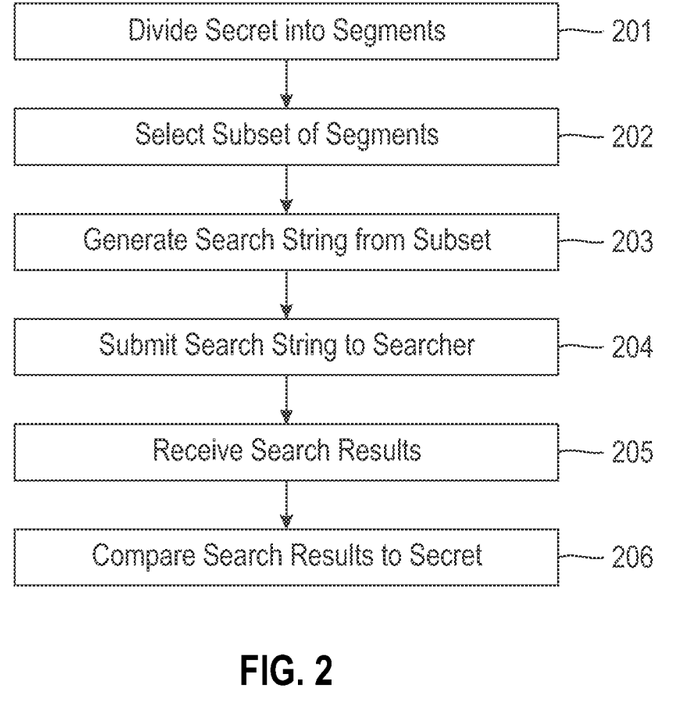
FIG. 2 depicts an exemplary method for searching according to an embodiment of the present disclosure.

Turning to FIG. 2, an exemplary method according to an embodiment of the present disclosure is provided. A secret is divided into segments 201. A subset of those segments is selected 202. A search string is generated based on that subset 203. The search string is submitted to a searcher 204. Search results are received from the searcher 205. The results are compared to the secret to determine whether the secret was found 206.

Figure 3:
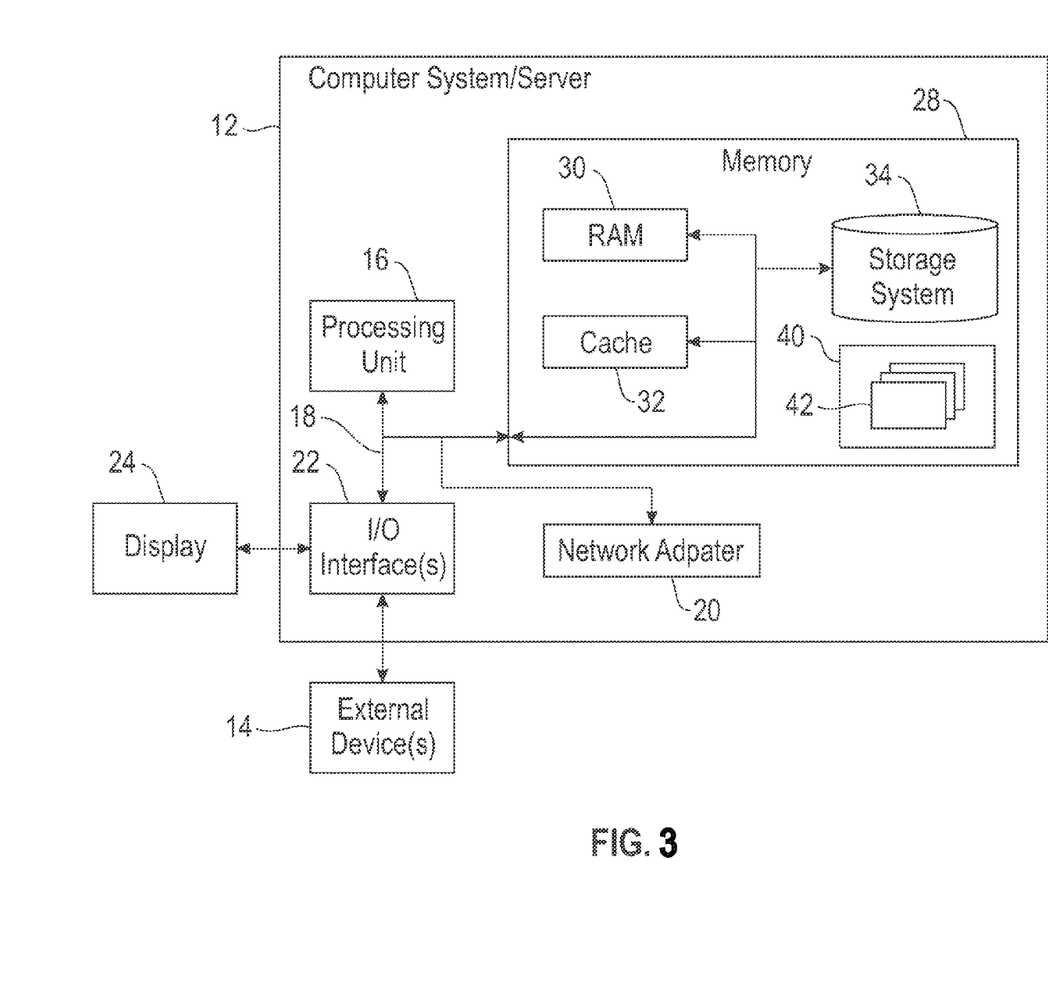
FIG. 3 depicts a computing node according to an embodiment of the present invention.

Referring now to FIG. 3, a schematic of an example of a computing node according to an embodiment of the present invention is provided. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
reading a secret value from a storage medium, wherein the secret value includes a sequence of words;
extracting a plurality of portions from the secret value, wherein a first certain portion of the secret value includes a first word of the sequence of words, and wherein a second certain portion of the secret value includes a second word of the sequence of words;
ranking each of the plurality of portions;
determining a subset of the secret value from the ranking of the plurality of portions, wherein the subset of the secret value includes a word of the sequence of words;
constructing a search string from the subset;
transmitting the search string to a searcher via a network;
receiving search results from the searcher via the network;
analyzing the search results to determine that there is a match between data of the search results and data of the secret value, wherein the analyzing is performed by the owner of the secret value; and
based on the match being determined initiating a change of the secret value, wherein the transmitting and the receiving are performed by a trusted party, and wherein a search by the searcher is performed so that knowledge of the secret value is limited to the trusted party, wherein the searcher is an untrusted party that provides to the trusted party additional context surrounding any search hits to facilitate ascertaining by the trusted party whether a search hit corresponds with an instance of the secret value, and wherein the searcher is provided by a search engine that has access to a plurality of digital resources.

2. The method of claim 1, wherein ranking comprises:
determining a likelihood that each of the plurality of portions occurs in a body of data except as part of the secret value.

3. The method of claim 1, wherein ranking comprises:
comparing each of the plurality of portions to a list comprising a second plurality of portions; and
assigning a predetermined rank to those of the plurality of portions contained in the list.

4. The method of claim 1, wherein ranking comprises: applying a pseudorandom function to each of the plurality of portions.

5. The method of claim 1, wherein the secret value includes a passphrase.

6. The method of claim 1, further comprising:
transmitting a context specification to the searcher; and
receiving context information from the searcher.

7. The method of claim 6, wherein the context specification specifies a plurality of metadata requested and the context information comprises the plurality of metadata.

8. The method of claim 1, wherein constructing the search string comprises:
introducing errors into the subset.

9. The method of claim 1, wherein constructing the search string comprises:
adding additional search terms not included in the secret.

10. The method of claim 1, wherein determining the subset comprises:
generating a plurality of candidate subsets;
ranking the candidate subsets; and
selecting the best ranked subset.

11. The method of claim 1, where the method includes retaining content of the secret value as secret not subject to searching by the searcher.

12. The method of claim 1, wherein the subset is a subsequence of words of the sequence of words.

13. The method of claim 1, wherein the trusted party is the owner of the secret value.

14. The method of claim 1, wherein the digital resources are provided by one or more of the following selected from the group consisting of: a document repository, a database, a file system, web pages, a social media outlet, forensic lab equipment, machine-readable memory, a network monitor, and a bus monitor.

15. The method of claim 1, wherein constructing the search string comprises concatenating the subset.

16. A computer program product for searching for secret data, the computer program product comprising a computer readable storage device having program code embodied therewith, the program code when executed by a processor to:
read a secret value from a storage medium, wherein the secret value includes a sequence of words;
extract a plurality of portions from the secret value, wherein a first certain portion of the secret value includes a first word of the sequence of words, and wherein a second certain portion of the secret value includes a second word of the sequence of words;
rank each of the plurality of portions;
determine a subset of the secret value from the ranking of the plurality of portions, wherein the subset of the secret value includes a word of the sequence of words;
construct a search string from the subset;
transmit by a trusted party the search string to an untrusted searcher via a network;
receive by the trusted party search results from an untrusted searcher via the network;
analyze the search results to determine that there is a match between data of the search results and data of the secret value; and
based on the match initiate a change of the secret value, wherein a search by the untrusted searcher is performed so that knowledge of the secret value is limited to the trusted party, wherein the untrusted searcher provides to the trusted party additional context surrounding any search hits to facilitate ascertaining by the trusted party whether a search hit corresponds with an instance of the secret value, and wherein the untrusted searcher is provided by a search engine that has access to a plurality of digital resources.

17. The computer program product of claim 16, wherein construct function includes a function to add additional search terms not included in the secret.

18. The computer program product of claim 16, wherein the secret value comprises a passphrase.

19. The computer program product of claim 16, wherein the secret value comprises a numerical value.

20. A system comprising:
a network adapter;
a computer readable storage device; and
a processor, wherein the processor executes instructions to:
read a secret value from the computer readable storage device, wherein the secret value includes a numerical value having a sequence of digits;

extract a plurality of portions from the secret value, wherein a first certain portion of the secret value includes a first subsequence of digits of the sequence of digits, and wherein a second certain portion of the secret value includes a second subsequence of digits of the sequence of digits;

rank each of the plurality of portions;

determine a subset of the secret value from the ranking of the plurality of portions, wherein the subset of the secret value includes a subsequence of digits of the sequence of digits;

construct a search string from the subset;

transmit by the owner of the secret value the search string to a searcher via the network adapter, wherein the owner of the secret value is a trusted party;

receive by the owner of the secret value search results from the searcher via the network adapter; and analyze the search results to determine that there is a match between data of the search results and data of the secret value; and based on the match initiate a change of the secret value, and wherein a search by the searcher is performed so that knowledge of the secret value is limited to the trusted party, wherein the searcher is an untrusted party that provides to the owner additional context surrounding any search hits to facilitate ascertaining by the owner whether a search hit corresponds with an instance of the secret value, and wherein the searcher is provided by a search engine that has access to a plurality of digital resources.

21. The system of claim 20, wherein the numerical value is encoded according to an encoding selected from the group consisting of: binary, decimal, hexadecimal, and base64.

\* \* \* \* \*

UNITED STATES PATENT AND TRADEMARK OFFICE
CERTIFICATE OF CORRECTION

PATENT NO. : 9,817,899 B2  
APPLICATION NO. : 14/010104  
DATED : November 14, 2017  
INVENTOR(S) : Geagan, III et al.

Page 1 of 1

It is certified that error appears in the above-identified patent and that said Letters Patent is hereby corrected as shown below:

On the Title Page

In the Assignee (73): Delete "GLOBALFOUNDRIES" and insert -- GLOBALFOUNDRIES INC. --

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*